United States Patent [19]

McKeigue et al.

[11] Patent Number: 5,486,318
[45] Date of Patent: Jan. 23, 1996

[54] LIQUID-VAPOR CONTACT COLUMN

[75] Inventors: Kevin McKeigue, New York; Ramachandran Krishnamurthy, Chestnut Ridge, both of N.Y.

[73] Assignee: The BOC Group, Inc., New Providence, N.J.

[21] Appl. No.: 366,350

[22] Filed: Dec. 29, 1994

[51] Int. Cl.⁶ .................................................. B01F 3/04
[52] U.S. Cl. .............................. 261/112.2; 261/DIG. 72
[58] Field of Search ......................... 261/112.2, DIG. 72

[56] References Cited

U.S. PATENT DOCUMENTS

| | | | |
|---|---|---|---|
| 1,848,576 | 3/1932 | Sandel | 261/DIG. 72 |
| 1,865,172 | 6/1932 | Cook | 261/DIG. 72 |
| 2,871,678 | 2/1959 | Smith et al. | 261/DIG. 72 |
| 2,986,379 | 5/1961 | Kramig, Jr. | 261/112.2 |
| 3,285,587 | 11/1966 | Huber | 261/112.2 |
| 3,402,105 | 9/1968 | Sze | 261/DIG. 72 |
| 3,423,268 | 1/1969 | Rahm et al. | 261/112.2 |
| 3,466,151 | 9/1969 | Sicard et al. | 261/112.2 |
| 4,294,663 | 10/1981 | Tennyson | 261/112.2 |
| 4,296,050 | 10/1981 | Meier | 261/112.2 |
| 4,427,607 | 1/1984 | Korsell | 261/112.2 |
| 4,623,454 | 11/1986 | Tauscher et al. | 261/112.2 |

FOREIGN PATENT DOCUMENTS

| | | | |
|---|---|---|---|
| 476980 | 9/1915 | France | 261/112.2 |
| 1088738 | 4/1985 | U.S.S.R. | 261/114.1 |

*Primary Examiner*—Tim R. Miles
*Attorney, Agent, or Firm*—David M. Rosenblum; Larry R. Cassett

[57] ABSTRACT

A liquid-vapor contact column comprising a column shell and one or more beds of structured packing located within the column shell. Each bed of structured packing includes a plurality of vertical stacks which are formed of at least two upper and lower levels of structured packing. The structured packing is partitioned to form the vertical stacks. When the structured packing is formed from corrugated sheet material, the vertical stacks can also be spaced from one another with the corrugated sheets making up the structured packing rotated 90° with respect to boarding vertical stacks of structured packing. The partitions or the rotated arrangement of the packing inhibit liquid migration in a transverse, horizontal direction of the column. This promotes constant liquid and vapor flow characteristics through each of the vertical stacks of structured packing to resist widespread liquid channeling throughout the column.

6 Claims, 2 Drawing Sheets

LIQUID-VAPOR CONTACT COLUMN

BACKGROUND OF THE INVENTION

The present invention relates to a liquid-vapor contact column in which one or more beds of structured packing is located within a column shell. More particularly, the present invention relates to such a column in which the structured packing is arranged in a plurality of vertical stacks. Even more particularly, the present invention relates to such a column in which liquid migration is inhibited between the vertical stacks in a transverse, horizontal direction of the column shell to promote constant liquid and vapor flow characteristics through each of the vertical stacks of structured packing.

In any packed column, under certain operating conditions, channeling will occur which will result in lower than expected packing performance. Packing, either random or structured, promotes liquid-vapor contact of liquid and vapor phases of a mixture to be separated. A film of the liquid phase descends through the packing while the vapor phase ascends through the packing to contact the liquid phase. In order for the packing to exhibit a projected separation performance, given by the height of packing per theoretical plate or HETP, the descending liquid and vapor flows must be uniform throughout the packing. During channeling, the uniformity of the downward flow of liquid or the upward ascent of vapor is interrupted.

It is known in the art that the potential for channeling can be reduced by segregating the packing into individual, smaller staggered columns that are located within a larger column. This is shown in U.S. Pat. No. 3,402,105 which addresses liquid channeling down the column walls. In this patent, each bed is formed by a stacked honeycomb structure in which each cell of the honeycomb is laterally staggered from a cell located either directly above or below such cell. The cells are filled with random oriented packing. As liquid descends through the packing, it sufficiently spreads out through the packing to contact the wall of each cell. The staggering of the cells ensures that liquid having contacted the walls of the cell will drop into packing contained within a honeycomb located directly below. While the staggering prevents liquid which has contacted the wall of a cell from continuing to flow along that wall, it permits the lateral migration of liquid across the full width of the column. Thus, if a vapor channel begins to form, for any reason, liquid can still be forced away from the vapor channel. As such, liquid flows are greater near the periphery of the column than in central locations of the column. While the division of the column into smaller columns will tend to inhibit channeling, the spreading liquid flow will create non-uniform flow characteristics through these sub-columns. As a result, liquid channeling while inhibited is not prevented.

As will be discussed, the present invention provides a liquid-vapor contact column in which liquid channeling is inhibited to a greater extent than prior art apparatus.

SUMMARY OF THE INVENTION

The present invention provides a liquid-vapor contact column that comprises a column shell and at least one bed of structured packing located within the column shell. The at least one bed of structured packing includes a plurality of vertical stacks, each formed of at least one pair of upper and lower levels of the structured packing. A means associated with each of the vertical stacks is provided for inhibiting migration of liquid in a transverse, horizontal direction of the column shell. This memos promotes constant liquid and vapor flow characteristics through each of the vertical stacks of the structured packing. Moreover, since constant liquid and vapor flow characteristics are promoted, a column formed in accordance with the subject invention that uses structured packing and continuous vertical stacks of the same is more resistant to channeling than a packed column of the prior art utilizing random packing within staggered cells.

It is to be noted there that as used herein and in the claims, the term "structured packing" means any liquid-vapor contact media having a regularly repeating pattern of surfaces which facilitates the contact of liquid and vapor phases to effect heat and/or mass transfer between the phases. Examples of structured packings which could be used in connection with the present invention include but are not limited to, those disclosed in U.S. Pat. No. 4,296,050 and 4,081,621 in which the structured packing is formed of corrugated sheet metal. The structured packing described in U.S. Pat. No. 5,158,712 which consists of a multilayered angular foil structure also has general applicability to the present invention as does that described in U.S. Pat. No. 5,325,504 in which the structured packing consists of a plurality of orthogonally oriented flow channels. Variation in these packings, including but not limited to changes in orientation, degree of perforation or open area, and material of fabrication would not effect the suitability of the packing for use in the present invention.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
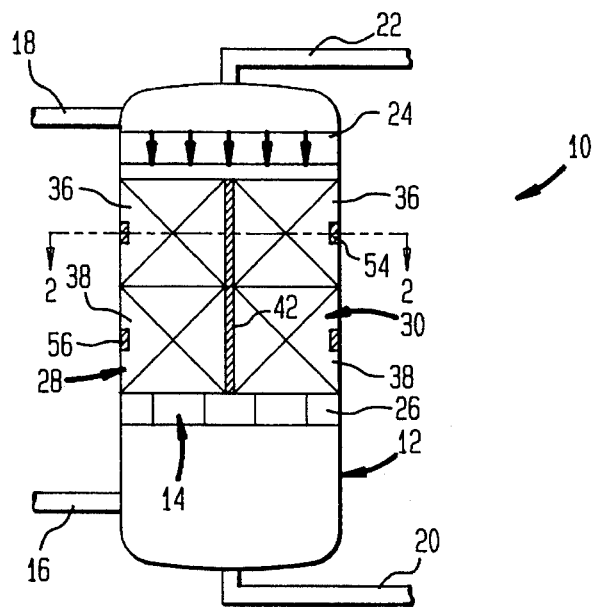
FIG. 1 is a sectional, schematic view of a liquid-vapor contact column of the present invention.
Figure 2:
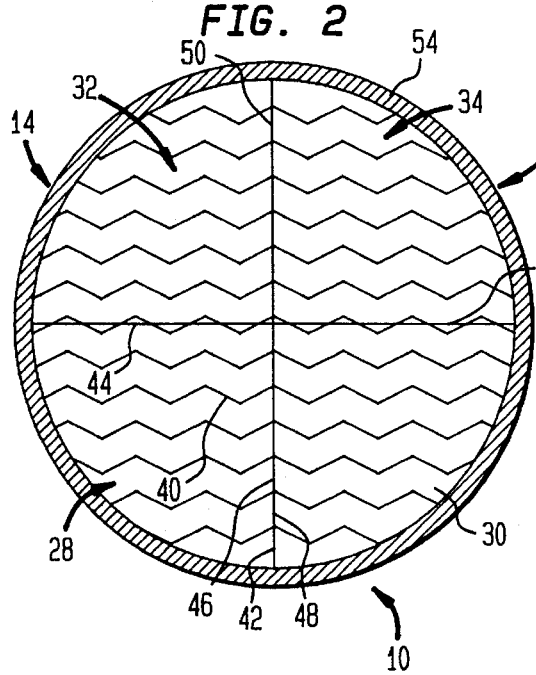
FIG. 2 is a sectional view of FIG. 1 taken along line 2—2 thereof.

With reference to FIGS. 1 and 2, a liquid-vapor contact column 10 in accordance with the present invention is illustrated. It is to be noted that the present invention is not limited to any specific application for liquid-vapor contact column 10.

Liquid-vapor contact column 10 has a column shell 12 and one bed of structured packing 14. As used herein and in the claims, when the term "bed of structured packing" is used, although not specifically stated, it is required by the use of such a term that such bed be located between one or more inlets, such as inlets 16 and 18 and/or outlets, such as outlets 20 and 22 or a combination of inlets or outlets. For instance, in FIG. 1, a gaseous phase of a mixture to be rectified for instance, in a cryogenic separation, is introduced through inlet 16 to produce an ascending vapor phase. The ascending vapor phase ascends through a structured packing bed 14 for contact with liquid being introduced into the top of liquid-vapor contact column 12 via inlet 18. Liquid is uniformly distributed to structured packing 14 by use of a known liquid distributor 24 and structured packing 14 is supported on a support 26 also known in the art.

The foregoing discussion is important because the present invention does not cover an embodiment in which an inlet or outlet to a distillation column 18 is situated in an intermediate location of a bed so that vapor or liquid flow characteristics change within the bed of structured packing 14. Additionally, it is to be noted the present invention is not limited to a single bed of structured packing, such as bed 14. Multiple beds obtained within a single or multi-column system would also be covered by the subject invention.

Bed 14 of structured packing includes four vertical stacks 28, 30, 32, and 34. Each vertical stack is formed by an upper level 36 and a lower level 38. It is to be noted that the subject invention would have equal applicability to beds formed of multiple pairs of upper and lower levels such as those designated by reference numerals 36 and 38 herein. The structured packing making up bed 14 is formed from a plurality of corrugated sheets 40 that are vertically oriented as column shell 12 so that liquid-vapor contact occurs in a vertical direction of the column shell 12. Corrugated sheets 40 forming upper levels 36 of stacks 28, 30, 32 and 34 are all oriented in one horizontal direction which in FIG. 2 runs in a left to right direction of the illustration. Lower levels 38 would also be arranged with their corrugated sheets oriented in the same horizontal direction which would be at right angles to the horizontal direction of sheets 40 of upper levels 36.

As liquid descends through the structured packing, it tends to spread out in upper levels 36 of each vertical stack (28, 30, 32, and 34) in a direction parallel to corrugated sheets 40 and towards the walls of liquid-vapor contact column 12. In order to redistribute the liquid, the corrugated sheets forming lower levels 38 of structured packing are therefore placed at their right angle orientation with respect to corrugated sheets 40 of upper levels 36.

A means is associated with each of the vertical stacks 28, 30, 32, and 34 of structured packing is provided to inhibit migration of the descending liquid in a transverse, horizontal direction of the column shell. Preferably such means is in the form of liquid impervious partitions 42 and 44 which can be sheet metal, riveted together or attached to each upper and lower level 36 and 38 forming each vertical stack 28, 30, 32, and 34 of structured packing. Partitions 42 and 44 form four channels 46, 48, 50 and 52 which extend continuously throughout the bed. This results in constant liquid and vapor flow characteristics within each channel 46, 48, 50 and 52, or more properly through each of the vertical stacks 28, 30, 32, and 34 of structured packing. As such, either channeling will not occur, or at the very least be inhibited to a far greater degree than prior art distillation columns. In order to re-conduct liquid which has contacted partitions 42 and 44 or column shell 12 back to the packing, liquid wiper bands 54 and 56 can be installed between the structured packing and column shell 12 and also, although not illustrated, between the structured packing and partitions 42 and 44.

Figure 3:
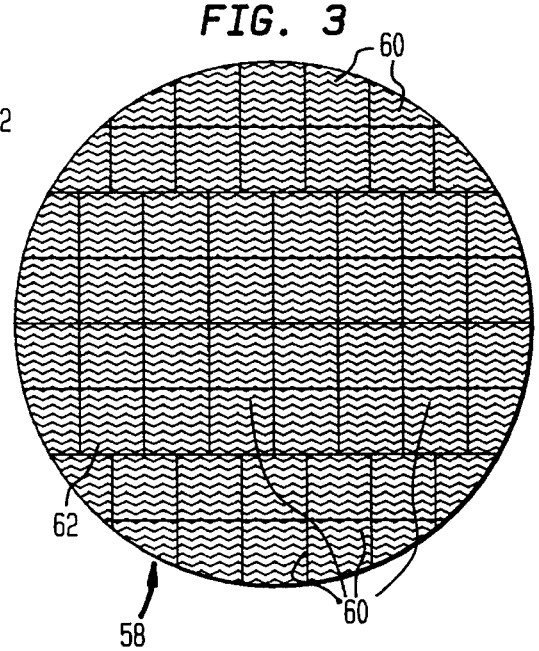
FIG. 3 is a transverse, cross-sectional view of a liquid-vapor contact column in accordance with the present invention having a larger diameter than the liquid-vapor contact column of FIG. 1.

Liquid-vapor contact column 10 has a diameter of approximately one meter. In larger column designs, the structured packing would have to be partitioned to a greater extent than that shown in FIG. 2. With reference to FIG. 3, a possible arrangement for a four meter column is illustrated. In the illustrated liquid-vapor contact column 58, the structured packing is subdivided by liquid-impervious partitions 60 into 56 vertical stacks of structured packing designated by reference numeral 62. As could be appreciated by those skilled in the art, although wiper bands are not illustrated, they could be provided in the same manner as mentioned above. The greater division of the four meter liquid-vapor contact column 58 is necessary because each of the vertical stacks should be in a range of between about $0.05 \text{ m}^2$ to about $0.80 \text{ m}^2$ in cross-sectional area in any size column. A preferred cross-sectional area for each of the vertical stacks of structured packing is $0.15 \text{ m}^2$.

As could be appreciated by those skilled in the art, although rectilinear partitioning of the column is illustrated, this is not strictly required. Partitioning with non-orthogonol walls could also be used to advantage within the scope of the present invention.

Figure 4:
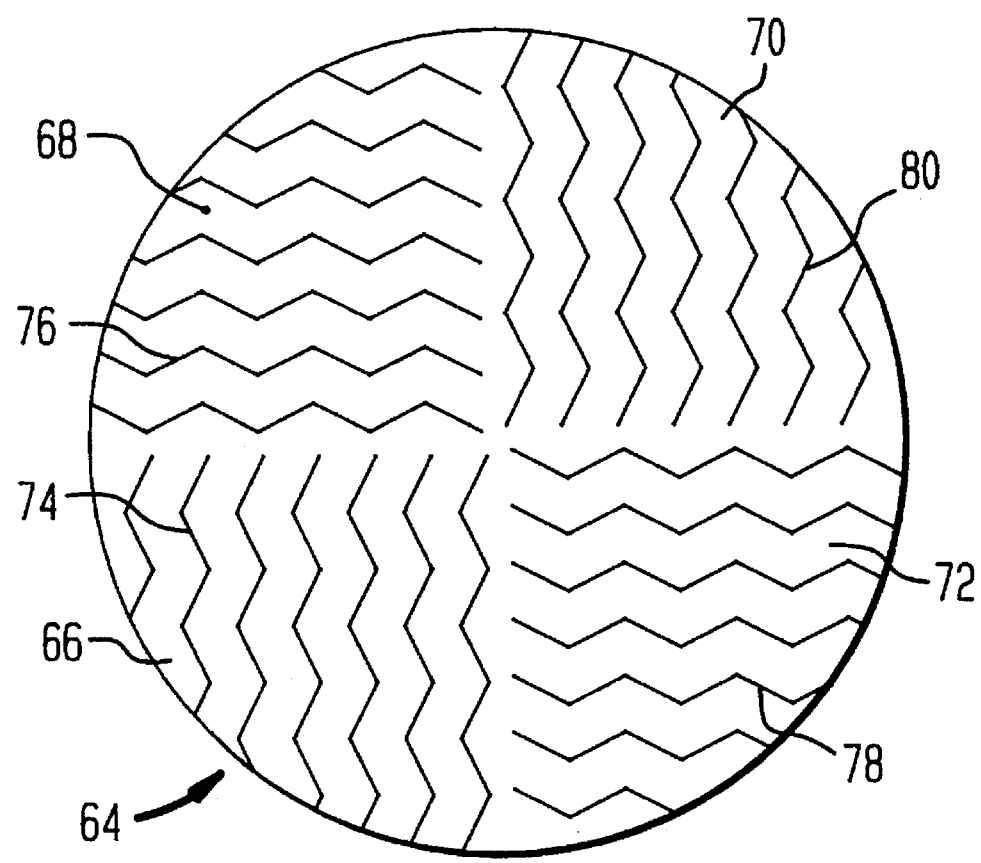
FIG. 4 is a transverse, cross-sectional view of an alternative embodiment of a liquid-vapor contact column in accordance with the present invention of the same size as the column illustrated in FIG. 1.

With reference to FIG. 4, a structured packing arrangement is shown to form vertical stacks of structured packing without the use of partitions. The structured packing used in this embodiment is the corrugated sheet-type of structured packing. FIG. 4 would be the arrangement for a one meter column 64 having upper levels 66, 68, 70 and 72 of structured packing. Upper level 66 can be seen to be laterally bordered by upper levels 68 and 72; upper level 68 is laterally bordered by upper levels 66 and 70 and etc. As illustrated upper level 66 contains corrugated sheets 74 that are at right angles to corrugated sheets 76 and 78 of laterally bordering upper levels 68 and 72, respectively. Liquid cannot therefore flow from upper level 66 to upper levels 68 and 72 because of such orientations of corrugated sheets 74, 76 and 78. Note also the orientation of corrugated sheets 80 of upper level 70 with respect to corrugated sheets 76 and 78 of upper levels 68 and 72. In such manner, migration of liquid is inhibited in a transverse horizontal direction. Although not illustrated, liquid wiper bands could be provided about the periphery of the structured packing to conduct liquid from the column shell back to the packing. Also, although not illustrated, the sheets forming the lower levels of structured packing would be at right angles to each of the upper levels 66, 68, 70 and 72. As such, an illustration of such lower levels would be identical to that shown for upper levels 66, 68, 70 and 72, except that the drawing would be rotated 90°. It should be pointed out that liquid impervious partitions could be used with this embodiment to divide the vertical stacks of structured packing.

While the invention has been described with reference to preferred embodiments, as will occur to those skilled in the art, numerous changes, omissions can be made without departing from the spirit and scope of the present invention.

We claim:

1. A liquid-vapor contact column comprising:

a column shell;

at least one bed of structured packing located within said column shell;

said at least one bed of structured packing including a plurality of vertical stacks each formed by at least one pair of upper and lower levels of said structured packing;

said structured packing formed of a plurality of corrugated sheets oriented so that liquid-vapor contact occurs in a vertical direction of said column shell and said corrugated sheets of said upper level of said structured packing oriented at right angles with respect to said corrugated sheets of said lower level of said structured packing; and means associated with each of said vertical stacks for inhibiting migration of liquid in a transverse, horizontal direction of said column shell thereby to promote constant liquid and vapor flow characteristics through each of said vertical stacks of said structured packing.

2. The liquid-vapor contact column of claim 1, wherein:

each of said upper and lower levels of said structured packing is laterally bordered by laterally bordering levels of said structured packing; and said liquid migration inhibiting means comprises said corrugated sheets of each of said upper and lower levels of said structured packing oriented at right angles to said corrugated sheets forming said laterally bordering levels of said structured packing.

3. The liquid-vapor contact column of claim 1, wherein:

each of said upper and lower levels of said structured packing is laterally bordered by laterally bordering levels of said structured packing;

said corrugated sheets of each of said upper and lower levels of said structured packing and its said laterally bordering levels of said structured packing being oriented in the same direction: and said liquid migration inhibiting means comprises a plurality of liquid impervious partitions subdividing said at least one bed of structured packing into said plurality of vertical stacks.

4. The liquid-vapor contact column of claim 1, wherein:

each of said upper and lower levels of said structured packing is laterally bordered by laterally bordering levels of said structured packing;

said corrugated sheets of each of said upper and lower levels of said structured packing and its said laterally bordering levels of said structured packing being oriented in the same direction: and said liquid migration inhibiting means comprises a plurality of liquid impervious partitions subdividing said at least one bed of structured packing into said plurality of vertical stacks.

5. The liquid-vapor contact column of claim 1, wherein each of said vertical stacks has a transverse cross-sectional area in a range of between about $0.05 \text{ m}^2$ and about $0.80 \text{ m}^2$.

6. The liquid-vapor contact column of claim 1, wherein each of said vertical stacks has a transverse cross-sectional area of about $0.15 \text{ m}^2$.

* * * * *